United States Patent
Kanno

(10) Patent No.: US 7,496,811 B2
(45) Date of Patent: Feb. 24, 2009

(54) STORAGE MEDIUM REPRODUCING APPARATUS, STORAGE MEDIUM REPRODUCING METHOD, AND COMPUTER PROGRAM PRODUCT FOR READING INFORMATION FROM STORAGE MEDIUM

(75) Inventor: Shinichi Kanno, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 525 days.

(21) Appl. No.: 11/360,604

(22) Filed: Feb. 24, 2006

(65) Prior Publication Data

US 2007/0064326 A1 Mar. 22, 2007

(30) Foreign Application Priority Data

Sep. 20, 2005 (JP) ............................. 2005-272684

(51) Int. Cl.
*G11C 29/00* (2006.01)
(52) U.S. Cl. ........................ 714/723; 714/721; 360/48
(58) Field of Classification Search ................. 714/721, 714/723
See application file for complete search history.

(56) References Cited

U.S. PATENT DOCUMENTS

| | | | | |
|---|---|---|---|---|
| 5,233,559 A | * | 8/1993 | Brennan, Jr. ............ | 365/185.09 |
| 5,243,570 A | * | 9/1993 | Saruwatari .................... | 714/7 |
| 5,377,147 A | * | 12/1994 | Merchant et al. ............. | 714/711 |
| 5,748,527 A | * | 5/1998 | Lee et al. ................ | 365/185.09 |
| 5,761,128 A | * | 6/1998 | Watanabe ................... | 365/201 |
| 5,774,396 A | * | 6/1998 | Lee et al. ................ | 365/185.09 |
| 5,920,508 A | * | 7/1999 | Miyakawa et al. ...... | 365/185.22 |
| 6,108,250 A | * | 8/2000 | Kengeri ........................ | 365/200 |
| 6,469,932 B2 | * | 10/2002 | Roohparvar et al. ... | 365/185.09 |
| 6,711,056 B2 | * | 3/2004 | Abedifard et al. ...... | 365/185.09 |
| 6,771,541 B1 | * | 8/2004 | Park ........................ | 365/185.18 |
| 7,173,852 B2 | * | 2/2007 | Gorobets et al. ........ | 365/185.09 |
| 2005/0166134 A1 | * | 7/2005 | Nagai ........................ | 714/823 |

FOREIGN PATENT DOCUMENTS

JP 11-154394 6/1999

OTHER PUBLICATIONS

U.S. Appl. No. 11/360,604, filed Feb. 24, 2006, Kanno.
U.S. Appl. No. 11/531,963, filed Sep. 14, 2006, Kanno.

* cited by examiner

*Primary Examiner*—Mujtaba K Chaudry
(74) *Attorney, Agent, or Firm*—Oblon, Spivak, McClelland, Maier & Neustadt, P.C.

(57) ABSTRACT

A storage medium reproducing apparatus includes a storage unit, a correction history storage unit, a correction history implementing unit, and a correcting unit. The storage unit includes a plurality of information storage units storing information depending on whether a charge quantity is greater than a predetermined charge quantity threshold value, and a correction code storage unit storing error correction codes for the information stored in the information storage units. The correction history storage unit stores a correction history containing identification information for the information storage unit corrected with an error correction code is performed, and a content of the correction. The correction history implementing unit corrects information in compliance with the content of the correction when the information is read from the information storage unit. The correcting unit performs a correcting operation using an error correction code on the corrected information, and registers the correction history of the corrected information storage unit.

10 Claims, 10 Drawing Sheets

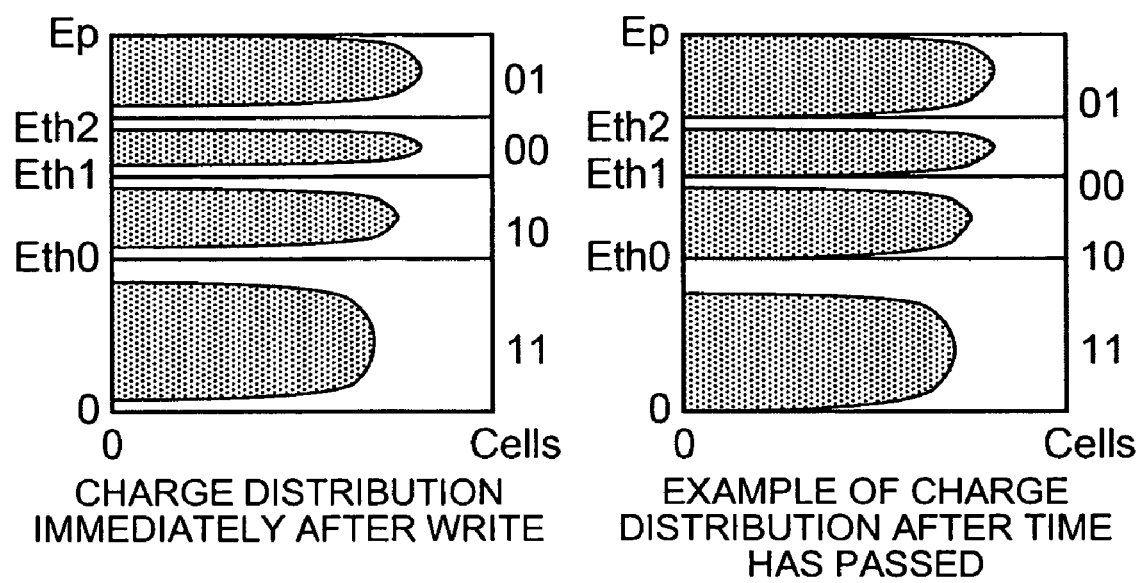

FIG.9

| STORAGE UNIT ID | CELL ID | CORRECTION CONTENTS |
|---|---|---|
| 1 | 1 | 11→10 |
| 1 | 1024 | 00→01 |
| n | 2 | 10→00 |

EL

STORAGE MEDIUM REPRODUCING APPARATUS, STORAGE MEDIUM REPRODUCING METHOD, AND COMPUTER PROGRAM PRODUCT FOR READING INFORMATION FROM STORAGE MEDIUM

CROSS-REFERENCE TO RELATED APPLICATIONS

This application is based upon and claims the benefit of priority from the prior Japanese Patent Application No. 2005-272684, filed on Sep. 20, 2005; the entire contents of which are incorporated herein by reference.

BACKGROUND OF THE INVENTION

1. Field of the Invention

The present invention relates to a storage medium reproducing apparatus, a storage medium reproducing method, and a computer program product for reading information from a storage medium.

2. Description of the Related Art

In recent years, semiconductor memories such as flash memories for storing information depending on charge quantities have been widely known. Also, multi-value memory techniques by which a plurality of threshold values are set for charge quantities have been developed so as to store information of a plurality of bits.

In such a semiconductor memory, charges are released with time. Therefore, when the quantity of released charges exceeds a threshold value, an error is generated at the time of information reading. Especially, in a multi-value memory having threshold values at narrow intervals, the probability of generating an error is high.

Meanwhile, so as to maintain the reliability of stored information, error correction codes are allotted to memory cell groups each containing a certain number of memory elements, and errors in information are corrected using the error correction codes according to a method disclosed in Japanese Patent Application Laid-Open No. H11-154394, for example.

However, a memory element that has the charge quantity exceeding the threshold value due to discharge constantly generates an error at the time of reading. Therefore, according to the conventional error correcting method, the same error correcting operation needs to be performed every time reading is performed, resulting in a large calculation amount in each correcting operation.

In addition to the memory elements that constantly generate errors due to discharging, there might be memory elements that newly generate errors. So as to correct the errors of such a large number of memory elements, a large number of correction codes are required. This results in an even larger calculation amount in each correcting operation.

SUMMARY OF THE INVENTION

According to one aspect of the present invention, a storage medium reproducing apparatus includes a storage unit, a correction history storage unit, a correction history implementing unit, and a correcting unit. The storage unit includes a plurality of information storage units storing information depending on whether a charge quantity is greater than a predetermined charge quantity threshold value, and a correction code storage unit storing error correction codes for the information stored in the plurality of information storage units. The correction history storage unit stores a correction history containing identification information for identifying the information storage unit on which a correcting operation using an error correction code is performed among the information storage units, and a content of the correction. The correction history implementing unit corrects information in compliance with the content of the correction stored in the correction history storage unit when the information is read from the information storage unit identified by the identification information. The correcting unit performs a correcting operation using an error correction code on the corrected information, and registers the correction history containing the identification information and the content of the correction of the information storage unit corrected using the error correction code, in the correction history storage unit.

According to another aspect of the present invention, a storage medium reproducing method includes correcting information that is read from an information storage unit identified by identification information in compliance with a correction content stored in a correction history storage unit that stores correction histories including the correction content and the identification information for identifying the information storage unit corrected using an error correction code among a plurality of information storage units each of which stores information depending on whether a charge quantity is greater than a predetermined charge quantity threshold value; and performing a correcting operation using an error correction code on the corrected information, and registering the correction history including the correction content and the identification information of the information storage unit corrected using an error correction code in the correction history storage unit.

A computer program product according to still another aspect of the present invention causes a computer to perform the storage medium reproducing method according to the present invention.

BRIEF DESCRIPTION OF THE DRAWINGS

FIG. 4 shows one example of the charge distribution of storage elements;

FIG. 5 shows an example data structure of a correction history storage unit;

FIG. 9 shows an example data structure of a correction history storage unit;

DETAILED DESCRIPTION OF THE INVENTION

Exemplary embodiments of a storage medium reproducing apparatus, a storage medium reproducing method, and a computer program product according to the present invention will be explained in detail below with reference to the accompanying drawings.

A storage medium reproducing apparatus according to a first embodiment stores the correction history using past error correcting codes in a storage unit, and performs a correcting operation referring to the correction history at the time of information reading. The storage medium reproducing apparatus also performs a correcting operation using an error correcting code on the results of the correction performed referring to the history.

Figure 1:
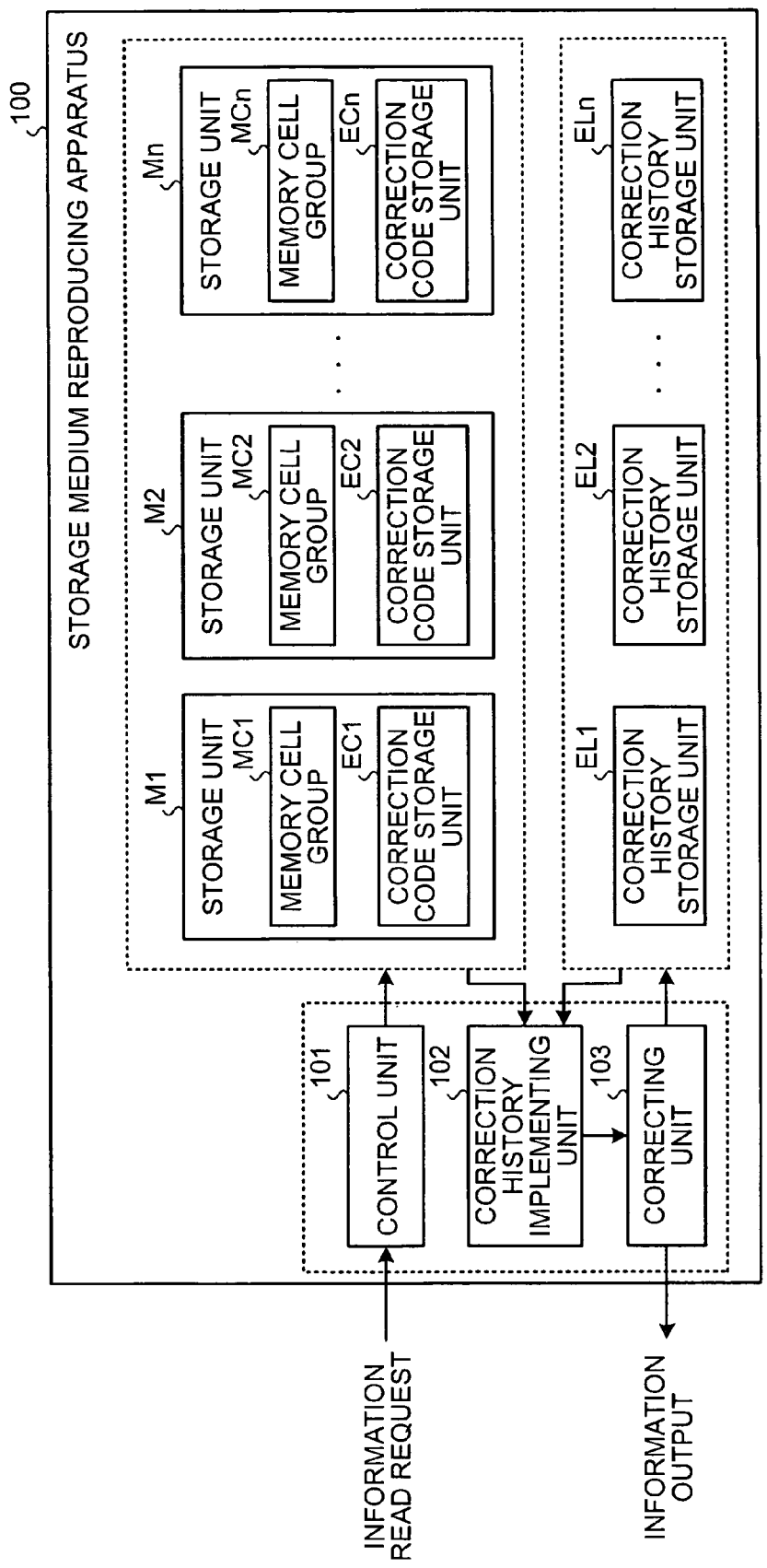
FIG. 1 is a block diagram showing the structure of a storage medium reproducing apparatus according to a first embodiment of the present invention.

FIG. 1 is a block diagram showing the structure of a storage medium reproducing apparatus 100 according to the first embodiment. As shown in FIG. 1, the storage medium reproducing apparatus 100 includes storage units M1 to Mn, correction history storage units EL1 to ELn, a control unit 101, a correction history implementing unit 102, and a correcting unit 103.

The storage units M1 to Mn are storage elements that store information, utilizing the differences in charge quantity in relation to a predetermined threshold value for the charge quantity. The storage units M1 to Mn may be formed with semiconductor memories that are generally used, such as flash memories or DRAMs (Dynamic Random Access Memories). The storage units M1 to Mn may also be formed with binary storage elements that hold one threshold value and store binary information consisting of 0 and 1. Alternatively, the storage units M1 to Mn may be formed with multi-value storage elements that hold different threshold values. In the following, a structure in which the storage units M1 to Mn are formed with 4-value storage elements is described.

The storage units M1 to Mn include memory cell groups MC1 to MCn and correction code storage units EC1 to ECn, respectively. The memory cell groups MC1 to MCn are storage units each including memory cells that are 4-value storage elements. Information to be stored in the storage units M1 to Mn is actually stored in the memory cell groups MC1 to MCn.

The correction code storage units EC1 to ECn are storage units each including memory cells that are 4-value storage elements, like the memory cell groups MC1 to MCn. Instead of the information to be stored, the correction code storage units EC1 to ECn store error correction codes corresponding to the information to be stored. The number of memory cells constituting each of the correction code storage units EC1 to ECn is not limited to 1, but may be up to the largest possible number for correction.

Figure 2:
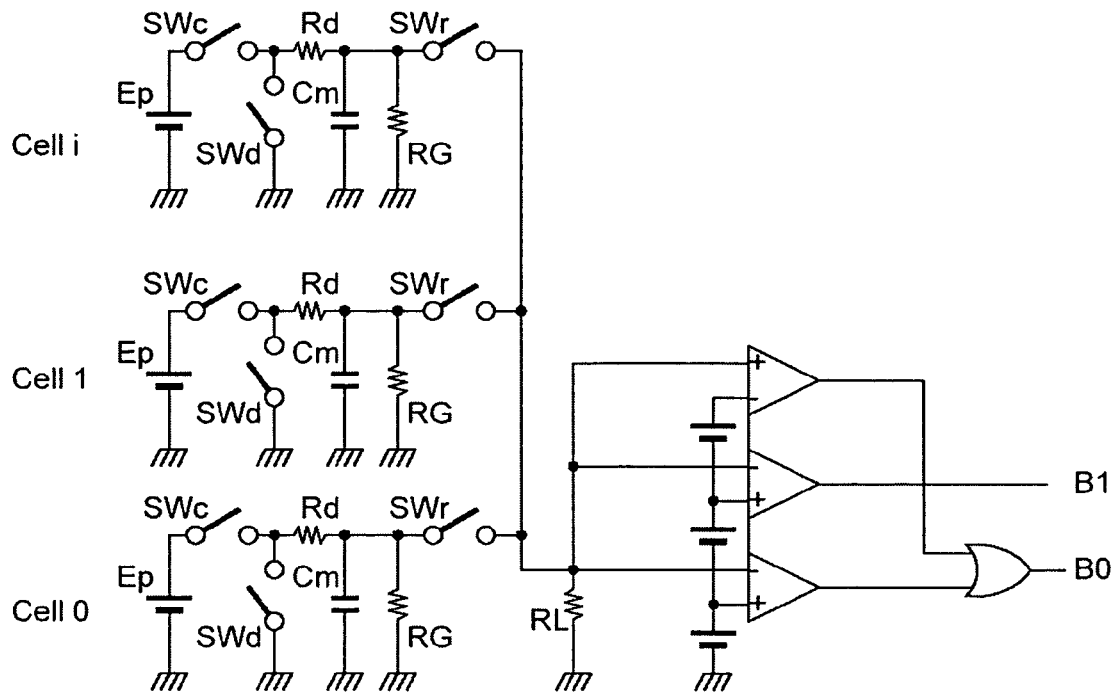
FIG. 2 shows an example of an equivalent circuit of a storage unit that is formed with 4-value storage elements.

FIG. 2 shows an example of an equivalent circuit of a storage unit that includes 4-value storage elements. The equivalent circuit shown in FIG. 2 is of a storage unit (hereinafter referred to as the storage unit Mn) of the storage units M1 to Mn.

As shown in FIG. 2, the storage unit Mn includes storage elements (Cell0 to Celli), and is designed to accumulate charges in each of the storage elements. The accumulated charges are compared with three threshold values by a comparator, so that 2-bit information of a bit B0 and a bit B1 can be output. Accordingly, 4-value information (01, 00, 10, 11) can be stored.

Figure 11:
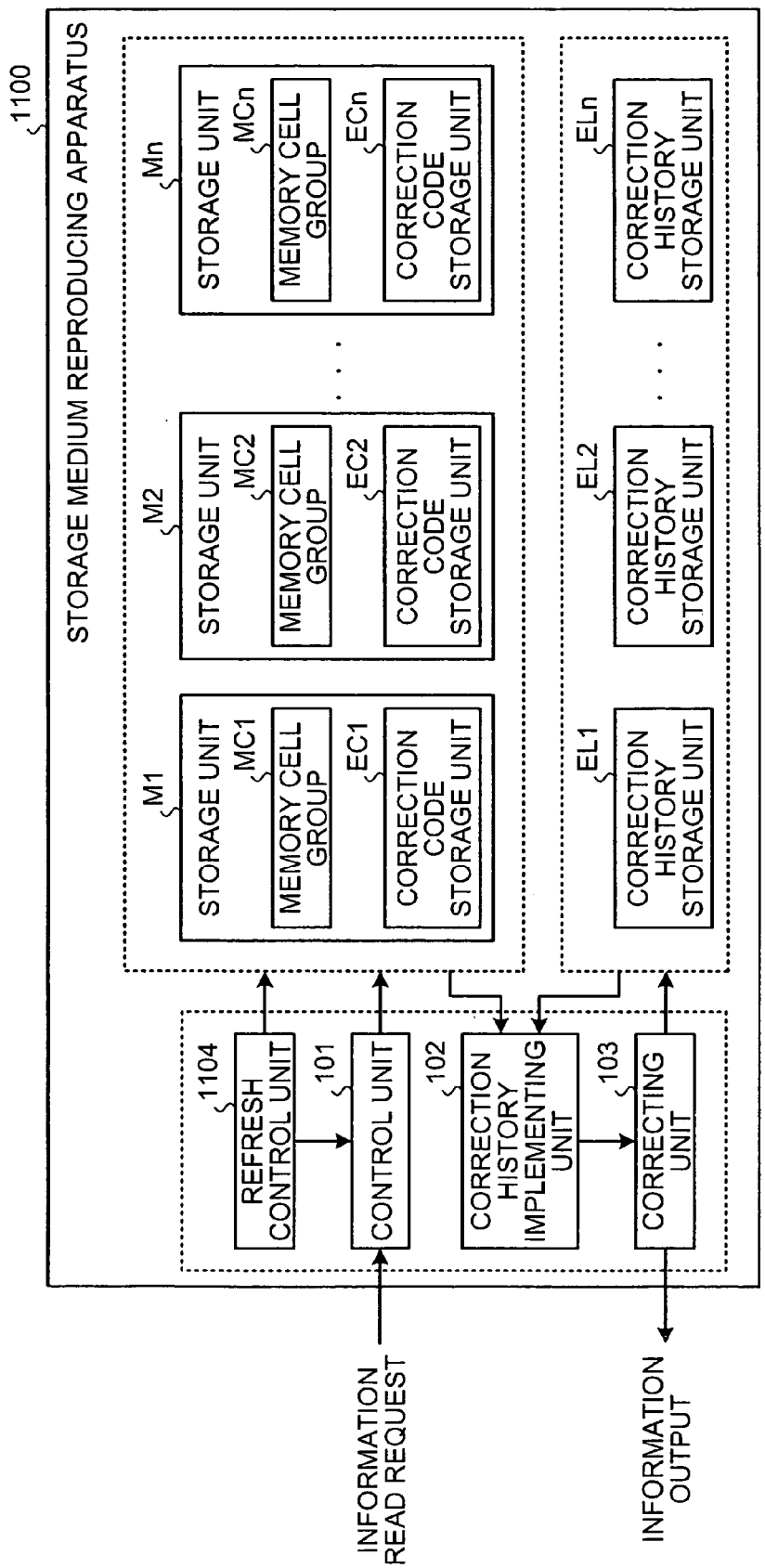
FIG. 11 is a block diagram showing the structure of a storage medium reproducing apparatus according to a fourth embodiment of the present invention.

Part of the storage elements (Cell0 to Celli) constitute the memory cell groups MCn shown in FIG. 11, and the rest of the storage elements constitute the correction code storage units ECn.

Figure 3:
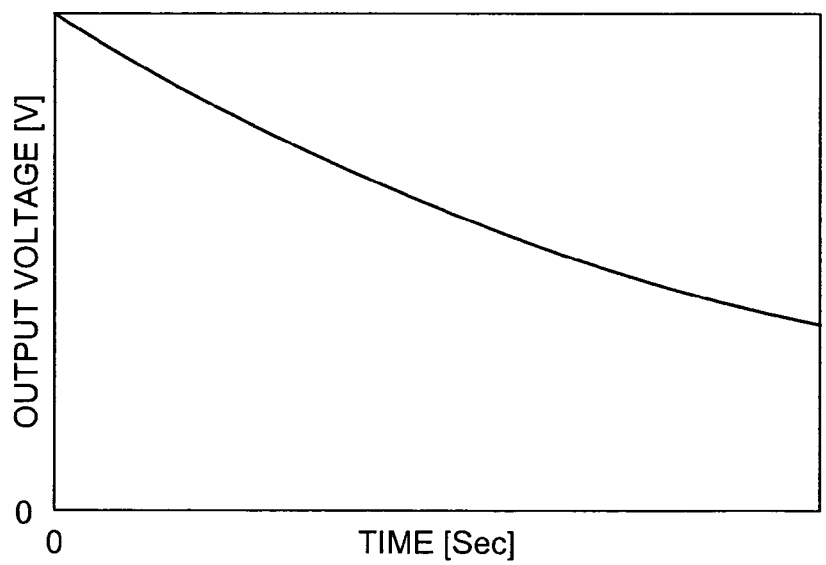
FIG. 3 shows the discharging of storage elements.

FIG. 3 shows the discharge from the storage elements. In the graph shown in FIG. 3, the starting point of write is represented by 0, with the abscissa axis indicating elapsed time and the ordinate axis indicating output voltage. A semiconductor memory such as a flash memory or a DRAM can maintain the stored contents even when the power supply is cut off. However, the charges accumulated in the storage elements are discharged after a long period of time has passed, and the output voltage decreases, as shown in FIG. 3.

FIG. 4 shows an example of charge distribution in the storage elements. The left side of FIG. 4 shows the charge distribution observed immediately after a write operation. The right side of FIG. 4 shows the charge distribution observed after a certain period of time has passed. The threshold values for the charge quantity are denoted by Eth0 to Eth2.

As shown in FIG. 4, the charges accumulated in the storage elements are discharged with time, and the charge distribution approaches the threshold values. As a result, the probability of an error to be caused at the time of information reading becomes higher.

The correction history storage units EL1 to ELn are storage units that store the history of the contents corrected by the correcting unit 103 using error correction codes. The correction history storage units EL1 to ELn are formed with storage elements that do not require refresh operations, such as FeRAMs (Ferroelectric Random Access Memories) or SRAMs (Static Random Access Memories).

The correction history storage unit ELn is referred when the correction history implementing unit 102 refers to the correction history and corrects information. In the first embodiment, the storage units M1 to Mn include the correction history storage units EL1 to ELn, respectively.

FIG. 5 shows an example data structure of the correction history storage units EL1 to ELn. The data structure shown in FIG. 5 is the data structure of a correction history storage unit (hereinafter referred to as the correction history storage unit ELn) of the correction history storage units EL1 to ELn.

As shown in FIG. 5, the correction history storage unit ELn stores the cell ID of the memory cell corrected with an error correction code among the memory cells contained in the memory cell group MCn. The cell ID is stored in association with the contents of the correction. For example, when "11" is corrected to be "10", the information of "11→10" is stored.

The correction histories stored in the correction history storage units EL1 to ELn are erased every time new information is written in the corresponding storage units M1 to Mn. This is because sufficient charges are accumulated in the memory cell groups MC1 to MCn when new information is written.

The control unit 101 receives an instruction such as an information read command directed to the storage units M1 to Mn. According to the instruction, the control unit 101 selects the storage unit from which information is to be read out, and controls the correcting operation.

The correction history implementing unit 102 refers to the correction history stored in the corresponding correction history storage units EL1 to ELn, with respect to the information read from the storage units M1 to Mn. The correction history implementing unit 102 then performs the same correcting operation as the correction contents contained in the correction history.

For example, when the information of the storage unit Mn is read out and the correction history of "cell ID=1" and "correction content=11→10" is stored in the correction history storage unit ELn, the operation of changing the information "11" to "10" is performed on the cell having the cell ID "1" in the storage unit Mn.

The correcting unit 103 performs a correcting operation using an error correction code on the information corrected by the correction history implementing unit 102 according to the correction content of the correction history. The correcting operation using an error correction code is performed by a conventional error correcting technique that enables immediate decoding, such as BCH (Bose-Chaudhuri-Hocquenghem) code decoding or RS (Reed-Solomon) code decoding.

The correcting unit 103 also stores the contents of the error correcting operation in the correction history storage units EL1 to ELn. More specifically, the cell ID of the memory cell that has an error is stored in association with the correction contents containing the information before and after the correction in the correction history storage units EL1 to ELn.

Figure 6:
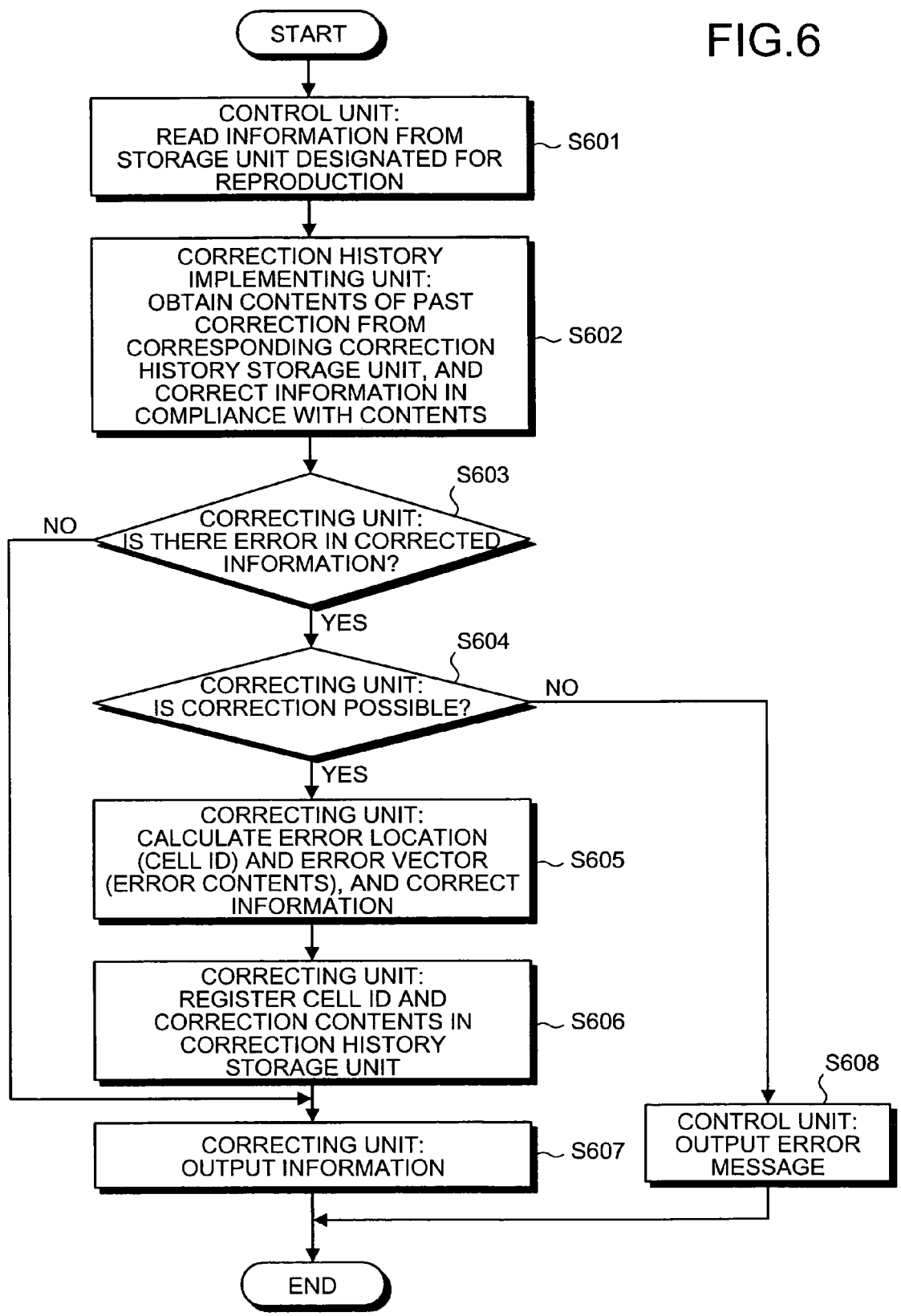
FIG. 6 is a flowchart of a storage medium reproducing operation according to the first embodiment.

Next, the storage medium reproducing operation to be performed by the storage medium reproducing apparatus 100 having the above structure according to the first embodiment is described. FIG. 6 is a flowchart of the entire storage medium reproducing operation according to the present invention.

First, the control unit 101 reads information from the storage unit that stores information designated to be reproduced (step S601). Here, information is read from a memory unit Mk (k being an integer).

The correction history implementing unit 102 obtains the contents of the past corrections from the correction history storage unit ELk corresponding to the storage unit Mk, and performs a correcting operation on the read information according to the obtained contents of the corrections (step S602).

The correction history shown in FIG. 5 is stored in the correction history storage unit ELk, for example, and the information "11" is read out from the memory cell with the cell ID of "1" among the memory cells contained in the memory cell group MCk in the memory storage unit Mk in step S601. In this case, the correction history corresponding to the cell ID of "1" exists in the correction history storage unit ELk, and the correction contents indicate the change of the information "11" to "10". Therefore, the information "11" is changed to "10" according to the correction contents.

Although the calculations to identify the cell that has generated an error and to identify the value to be corrected are required in a conventional error correcting operation using an error correction code, such calculations are not necessary in the method of the first embodiment. Therefore, the workload in each correcting operation can be reduced.

Next, the correcting unit 103 determines whether an error exists in the information corrected by the correction history implementing unit 102 (step S603). If an error exists ("YES" in step S603), the correcting unit 103 determines whether an error can be made using an error correction code (step S604). More specifically, using the above described error correcting technique, whether a correction can be made is determined according to whether the number of error bits exceeds the number of correctable number of bits.

If determining that a correction can be made ("YES" in step S604), the correcting unit 103 calculates the error location and the error vector, and corrects the information (step S605). The error location is the information indicating the memory cell having the error generated among the memory cells, and is equivalent to the cell ID of the correction history storage unit ELk. The error vector is the information indicating the method of converting error information into correct information, and is equivalent to the correction contents stored in the correction history storage unit ELk.

Next, the correcting unit 103 registers the calculated cell ID and the correction contents as the correction history in the correction history storage unit ELk (step S606). The correction history calculated in step S605 is the correction history of the error newly generated in the current information reading operation. In this manner, only the correction history of the error newly generated is additionally registered in the correction history storage unit ELk, so that the correction history can be referred to in later reading operations.

After the correction history is registered in the correction history storage unit ELk (step S606), or after an error is determined not to exist in the information corrected by the correction history implementing unit 102 ("NO" in step S603), the correcting unit 103 outputs the corrected information, or the read information after normal reading is performed (step S607). Here, the storage medium reproducing operation comes to an end.

If a correction using an error correction code is determined not to be made ("NO" in step S604), the control unit 101 makes an output to the effect that an error has been generated (step S608). Here the storage medium reproducing operation comes to an end.

As described above, in the storage medium reproducing apparatus according to the first embodiment, an error correction can be made referring to the history of error correction using error correction codes stored in the storage unit. Accordingly, the calculation workload can be reduced in each correcting operation. Also, as a correction using an error correction code is made to only a newly generated error, the number of correction codes required for corrections can be reduced.

In the first embodiment, even errors generated by factors other than discharging, such as errors caused by noise, are stored as the correction history. Therefore, even when noise is eliminated and reading is properly performed, a correction is made by the correction history implementing method. As a result, an inadvertent correction may be made.

A storage medium reproducing apparatus according to a second embodiment eliminates this problem by storing the contents of an error correction in the storage unit only when the error to be corrected using an error correction code is considered to have been caused by discharging.

The second embodiment differs from the first embodiment in the operation to be performed by the correcting unit 103. The other aspects of the structure and the functions are the same as those of the storage medium reproducing apparatus 100 of the first embodiment shown in the block diagram in FIG. 1, and therefore, the explanation thereof is not repeated herein.

Figure 7:
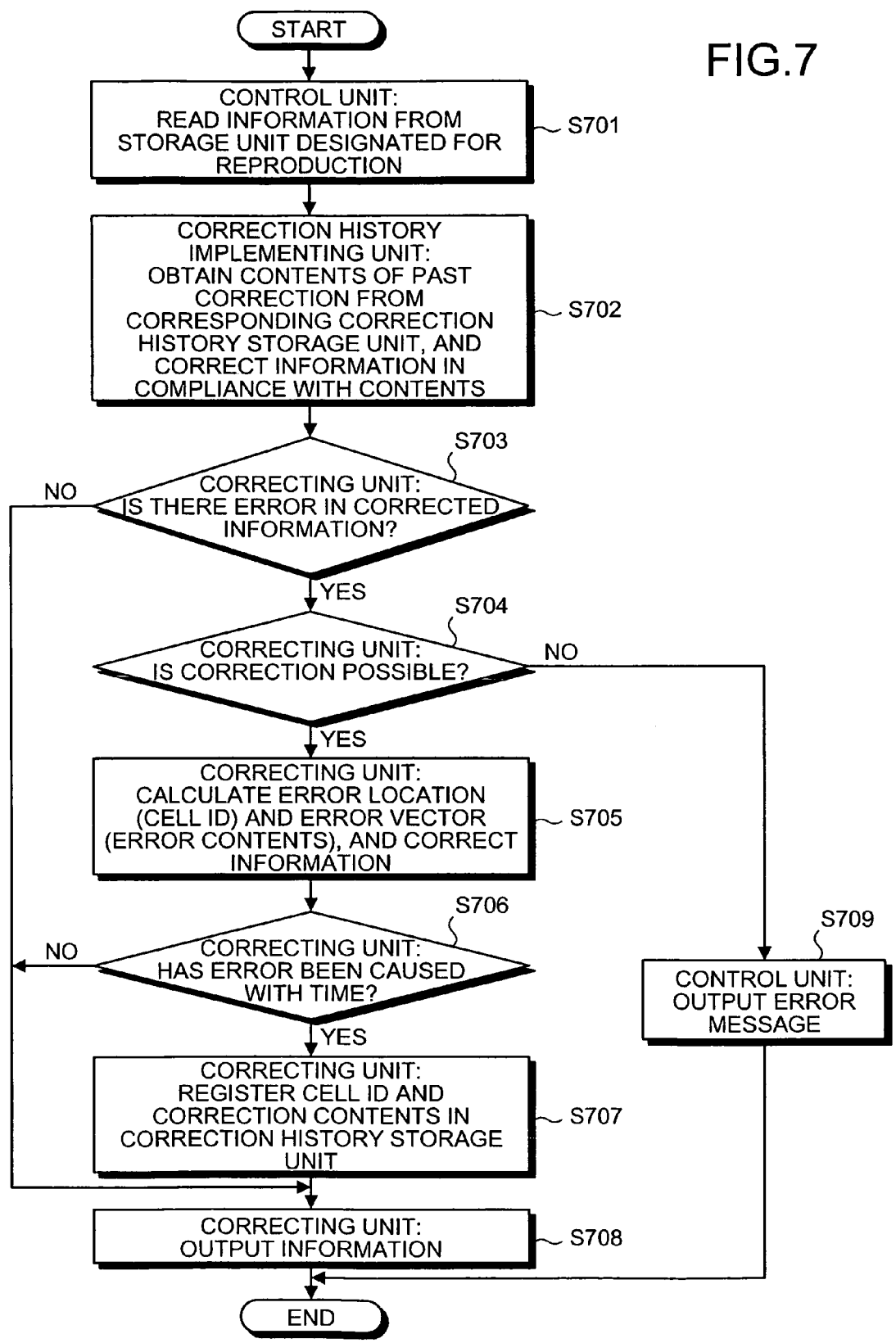
FIG. 7 is a flowchart of a storage medium reproducing operation according to a second embodiment of the present invention.

Next, the storage medium reproducing operation to be performed by the storage medium reproducing apparatus according to the second embodiment is described. FIG. 7 is a flowchart of the storage medium reproducing operation according to the second embodiment.

The information reading procedures and the information correction procedures of step S701 to step S705 are the same as the procedures of step S601 to step S605 to be performed in the storage medium reproducing apparatus 100 according to the first embodiment, and therefore, the explanation thereof is not repeated herein.

After correcting the information using an error correction code (step S705), the correcting unit 103 determines whether the corrected error is caused with time (step S706). The "error caused with time" is an error generated by the discharging of storage elements as shown in FIG. 3.

More specifically, the correcting unit 103 determines whether the error in the information exceeds threshold values Eth0 to Eth2 due to discharging as shown in FIG. 4. For example, the information "01" is wrongly read out as "00", it can be regarded as an error exceeding the threshold value Eth2 shown in FIG. 4 due to discharging. Accordingly, the correcting unit 103 determines that the error is caused with time.

Errors that may be caused with time include "01→00", "00→10", and "10→11". When a long period of time has passed, errors might exceed two threshold values, and therefore, may include "01→10", "01→11", and "00→11".

If the error is determined not to have been caused with time ("NO" in step S706), the correction history is not registered in the correction history storage units EL1 to ELn, but the corrected information is output (step S708).

If the error is determined to be have been caused with time ("YES" in step S706), the correction history is registered in the correction history storage units EL1 to ELn (step S707), and the corrected information is output (step S708).

As in the first embodiment, if a correction is determined to be impossible in step S704, an error message is output (step S709).

As described above, in the storage medium reproducing apparatus according to the second embodiment, only when the error corrected using an error correction code can be regarded as an error caused by discharging, the contents of the error correction are stored in the correction history storage unit, so that the contents of the error correction can be referred to in later correcting operations. Thus, unnecessary correcting operations can be restricted to the smallest possible number.

A storage medium reproducing apparatus according to a third embodiment of the present invention is to store the correction histories of a plurality of storage units in a single storage unit.

Figure 8:
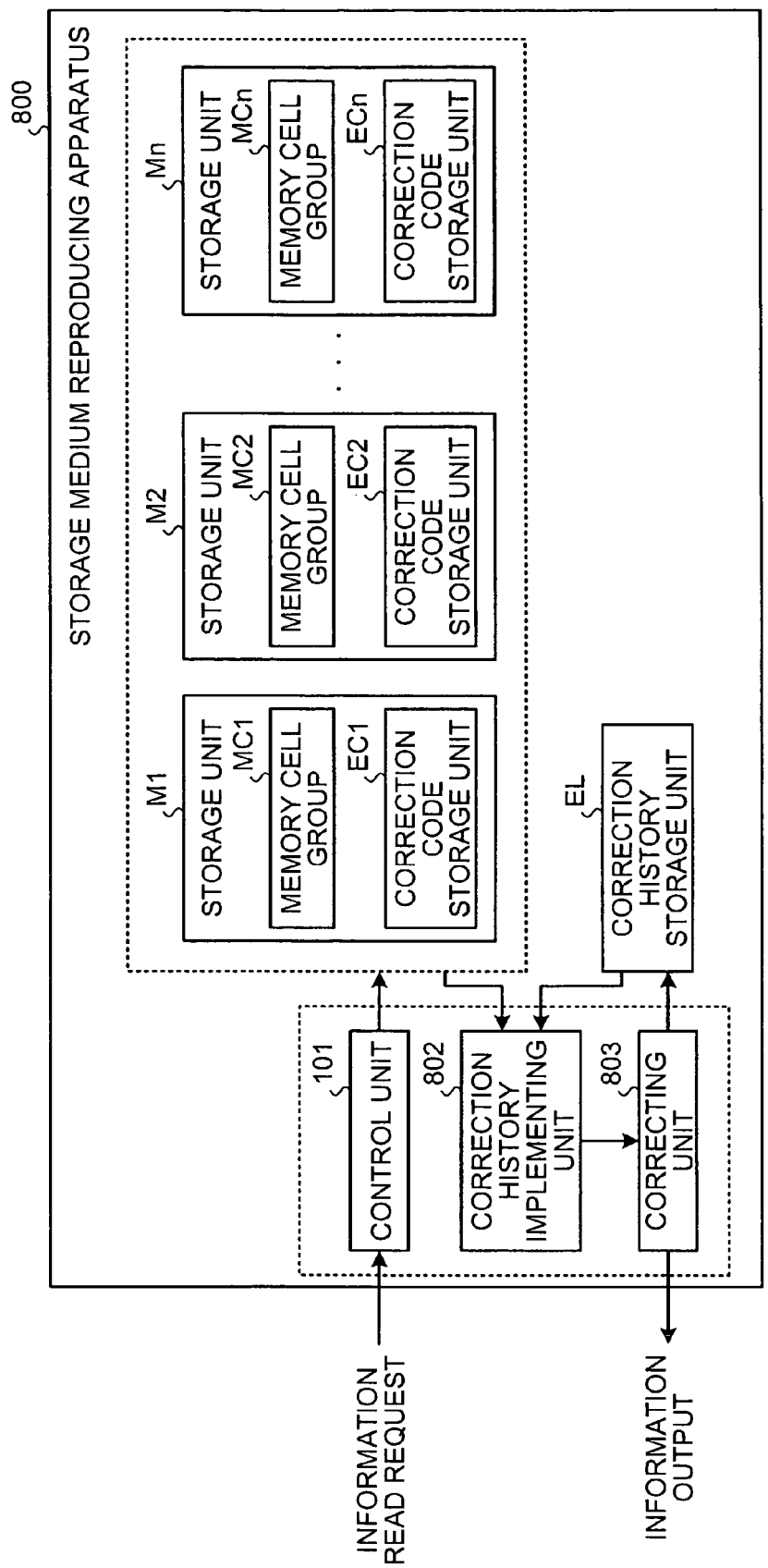
FIG. 8 is a block diagram showing the structure of a storage medium reproducing apparatus according to a third embodiment of the present invention.

FIG. 8 is a block diagram showing the structure of a storage medium reproducing apparatus 800 according to the third embodiment. As shown in FIG. 8, the storage medium reproducing apparatus 800 includes storage units M1 to Mn, a correction history storage unit EL, a control unit 101, a correction history implementing unit 802, and a correcting unit 803.

The third embodiment differs from the first embodiment in that only one correction history storage unit EL and the operations to be performed by the correction history implementing unit 802 and the correcting unit 803. The other aspects of the structure and functions of the third embodiment are the same as those of the storage medium reproducing apparatus 100 of the first embodiment shown in the block diagram in FIG. 1, and therefore, the explanation thereof is not repeated herein.

Like the correction history storage units EL1 to ELn of the first embodiment, the correction history storage unit EL stores the history of the contents corrected by the correcting unit 803 using error correction codes. The correction history storage unit EL is formed with storage elements that does not require a refresh operation, such as FeRAMs and SRAMs.

Although the correction history units EL1 to ELn are provided for the storage units M1 to Mn in the first embodiment, only one correction history storage unit EL is provided for the storage units M1 to Mn in the third embodiment.

FIG. 9 shows an example of the data structure of the correction history storage unit EL. As shown in FIG. 9, the correction history storage unit EL stores the storage unit ID for identifying the subject storage unit among the storage units M1 to Mn, the cell ID for identifying the memory cell corrected with an error correction code among the memory cells contained in the memory cell group MCn in the storage unit identified by the storage unit ID, and the contents of the correction. Here, the storage unit ID, the cell ID, and the correction contents are associated with one another.

When the storage units M1 to Mn are involved, allocating a large storage area to each storage unit might lead to a large unused area in the storage area, because the number of storage units that often generates errors is limited. In the third embodiment, the storage units M1 to Mn share the correction history storage unit EL, so as to improve the usage efficiency of the storage area.

The number of correction history storage units is not limited to one, but it is possible to employ a plurality of correction history storage units. In such a case, the storage units M1 to Mn are divided into groups, and one correction history storage unit EL is provided for each of the groups so that the correction history storage unit EL can be shared among the storage units in each group.

The correction history implementing unit 802 searches the correction history storage unit EL for the correction history corresponding to the storage unit ID of the storage unit (one of the storage units M1 to Mn) from which information has been read. If the correction history is found, a correcting operation is performed according to the contents of the correction history.

In the third embodiment, the correction histories of all the storage units M1 to Mn are stored in the single correction history storage unit EL, unlike the case of the first embodiment. Therefore, the correction history associated with the storage unit ID of the storage unit from which information has been read is searched for. If the correction history is found, a correcting operation is performed in compliance with the correction contents contained in the obtained correction history.

Like the correcting unit 103 of the first embodiment, the correcting unit 803 performs a correcting operation using an error correction code on the information corrected by the correction history implementing unit 802 in compliance with the correction contents of the correction history. The correcting unit 803 of the third embodiment differs from the correcting unit 103 of the first embodiment in storing the contents of error correcting operations on all the storage units M1 to Mn in the correction history storage unit EL.

Figure 10:
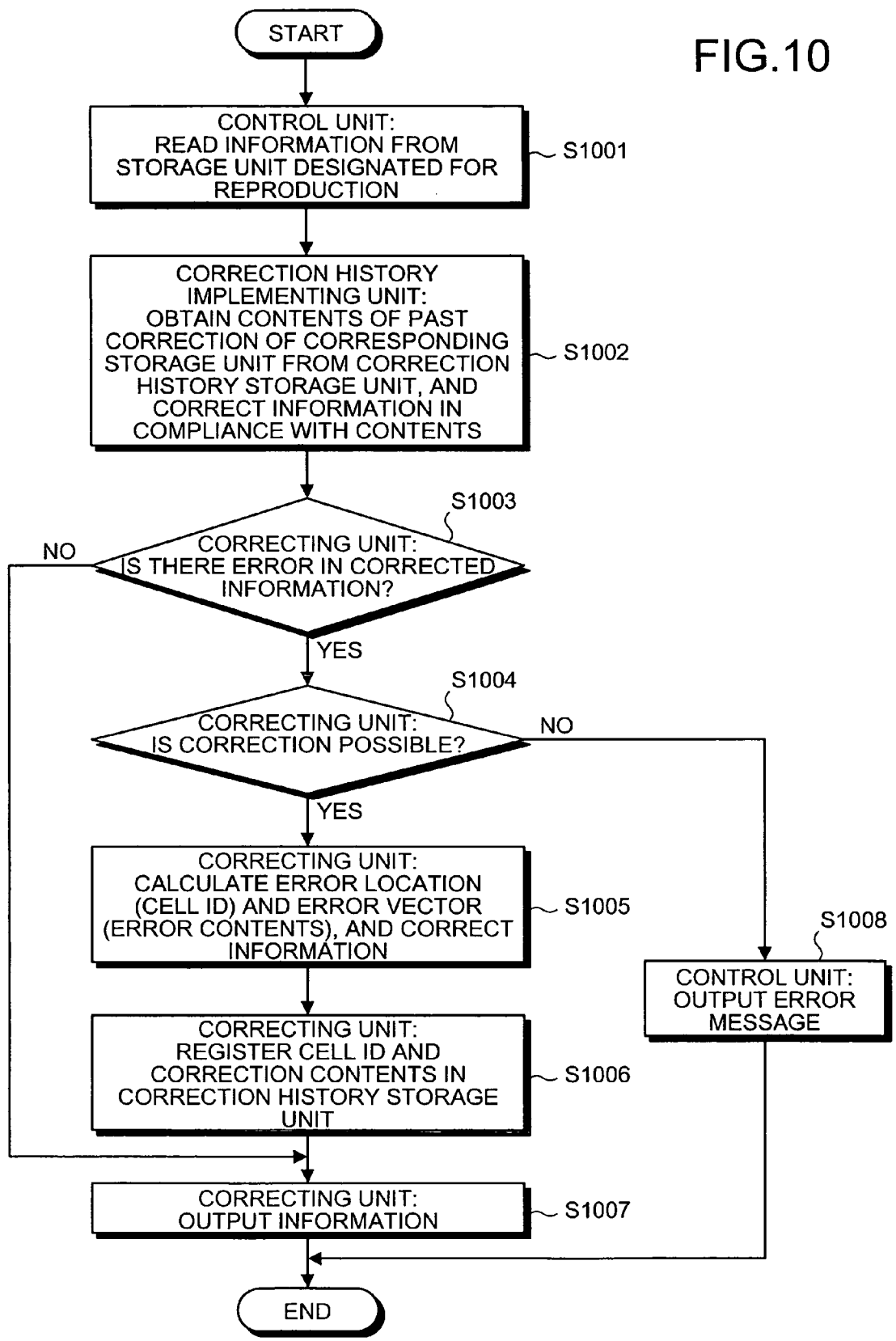
FIG. 10 is a flowchart of a storage medium reproducing operation according to the third embodiment.

Next, the storage medium reproducing operation to be performed by the storage medium reproducing apparatus 800 according to the third embodiment is described. FIG. 10 is a flowchart of the storage medium reproducing operation according to the third embodiment.

The information reading operation in step S1001 is the same as that of step S601 to be performed in the storage medium reproducing apparatus 100 of the first embodiment, and therefore, explanation of step S1001 is repeated.

After the information reading operation (step S1001), the correction history implementing unit 802 acquires the contents of the past correction of the storage unit Mk from which the information has been read, from the correction history storage unit EL, and then performs a correcting operation in compliance with the contents of the past correction (step S1002). More specifically, the correction history corresponding to the storage unit ID of the storage unit Mk from which the information has been read is searched from the correction history storage unit EL. If the correction history is found, a correcting operation is performed in compliance with the correction contents of the searched correction history.

The correcting operation using error correction codes and the information outputting operation of step S1003 to step S1008 are the same as those of step S603 to step S608 to be performed in the storage medium reproducing apparatus 100 of the first embodiment, and therefore, the explanation thereof is not repeated herein.

As described above, in the storage medium reproducing apparatus according to the third embodiment, the correction histories of a plurality of storage units are stored in a single correction history storage unit. Accordingly, the number of storage elements required for storing correction histories can be reduced, and the usage efficiency of the storage area can be increased.

A storage medium reproducing apparatus according to a fourth embodiment is to perform a refresh operation on storage elements, if the amount of errors exceeds a predetermined threshold value.

FIG. 11 is a block diagram showing the structure of a storage medium reproducing apparatus 1100 according to the fourth embodiment. As shown in FIG. 11, the storage medium reproducing apparatus 1100 includes storage units M1 to Mn, correction history storage units EL1 to ELn, a control unit 101, a correction history implementing unit 102, a correcting unit 103, and a refresh control unit 1104.

The fourth embodiment differs from the first embodiment in that the refresh control unit 1104 is added. The other aspects of the structure and functions of the fourth embodiment are the same as those of the storage medium reproducing apparatus 100 of the first embodiment shown in the block diagram in FIG. 1, and therefore, the explanation thereof is not repeated herein.

If the error generation amount indicating the degree of error generation exceeds the predetermined threshold value, the refresh control unit 1104 performs a refresh operation so as to maintain the charge quantity of the storage elements at a normal value. For example, with the error generation amount being the number of correction histories recorded in the correction history storage units EL1 to ELn; a refresh operation is performed when the number of correction histories exceeds the predetermined threshold value.

If the discharging of the storage elements of the memory cell groups MC1 to MCn proceeds substantially at the same speed, a memory cell group having a large number of correction histories has a long period of time passed since the last write operation, and tends to contain many storage elements that are to generate errors in an information reading operation as the charge quantity exceeds the threshold value (Eth0 to Eth2 shown in FIG. 4). Therefore, a refresh operation is performed if the number of stored correction histories exceeds the predetermined value.

The timings of writing information in the storage elements of the memory cell groups MC1 to MCn do not vary greatly, in view of the nature of the operation of writing information and adding the corresponding error correction codes. Accordingly, the write operations in the storage elements of the memory cell groups MC1 to MCn can be considered to be simultaneously performed. Thus, the number of correction histories can be used as the criterion of judgment for the error generation amount, as described above.

The criterion for the error generation amount is not limited to the number of correction histories, but may be any type of information as long as it indicates the degree of error generation.

For example, the number of storage elements newly corrected with error correction codes may be used as the criterion for error generation amount. In the memory cell groups MC1 to MCn that have many errors newly discovered through the correcting operations using correction codes, a long period of time has passed since the last write operation. If the discharging of the storage elements in the memory cell groups MC1 to MCn proceeds substantially at the same speed, there is a high probability of containing many storage elements that exceed the threshold value for the charge quantity and generate errors in reading operations.

Alternatively, the number of storage elements that exceed a predetermined number of threshold values for the charge quantity may be used as the criterion for the error generation amount. For example, in a case of 4-value storage elements, a refresh operation may be performed on the memory cell groups MC1 to MCn in which the number of storage elements that exceeds a plurality of threshold values for the charge quantity is greater than a predetermined threshold value.

Exceeding a plurality of threshold values for the charge quantity rarely happens. However, such memory cell groups MC1 to MCn have a long period of time since the last write operation. If the discharging of the storage elements in the memory cell groups MC1 to MCn proceeds substantially at the same speed, there is a high probability of containing many storage elements that exceed the threshold value for the charge quantity and generate errors in reading operations.

Alternatively, the capacity of information storage of the correction history storage units EL1 to ELn may be used as the criterion for the error generation amount. Especially in the case where the correction history storage unit EL is shared among the storage units M1 to Mn as in the third embodiment, the correction history storage unit EL may exceed the storage capacity, even if the number of errors observed in the memory cell groups MC1 to MCn is small.

In this case, the memory cell groups MC1 to MCn to be refreshed can be arbitrarily selected from the memory cell groups sharing the correction history storage units EL. However, a refresh operation may be performed on the memory cell group having the largest number of stored error correction histories, and the corresponding correction history is erased. Accordingly, the reliability of the information stored in the memory cell groups with many errors can be maintained, and the storage area of the correction history storage units EL can be properly increased.

Figure 12:
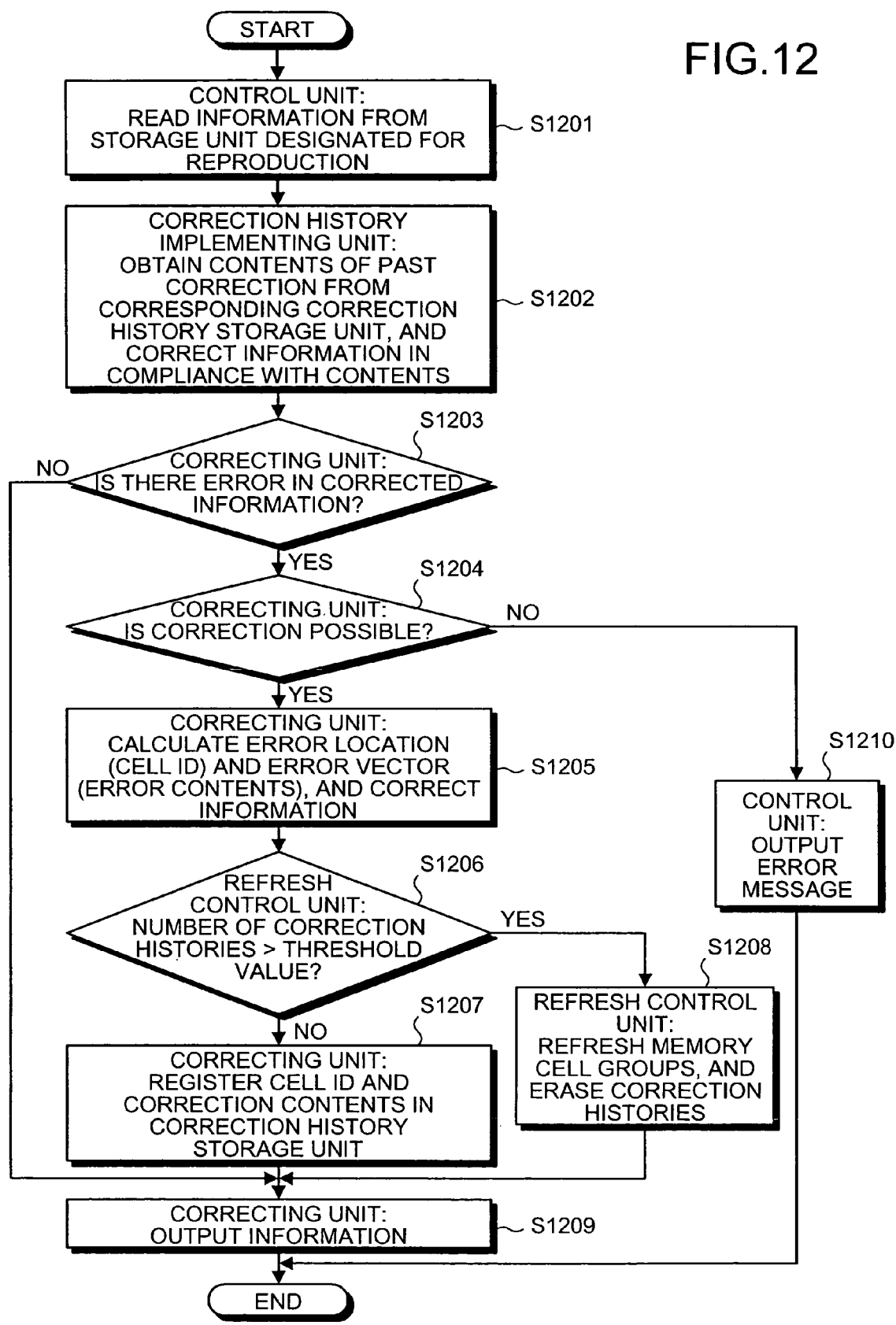
FIG. 12 is a flowchart of a storage medium reproducing operation according to the fourth embodiment.

Next, the storage medium reproducing operation to be performed by the storage medium reproducing apparatus 1100 according to the fourth embodiment is described. FIG. 12 is a flowchart of the storage medium reproducing operation according to the fourth embodiment.

The information reading procedures and the information correcting procedures of step S1201 to step S1205 are the same as those of step S601 to step S605 to be carried out in the storage medium reproducing apparatus 100 according to the first embodiment, and therefore, the explanation thereof is not repeated herein.

After the correcting unit 103 corrects information using an error correction code (step S1205), the refresh control unit 1104 determines whether the number of correction histories recorded in the correction history storage units EL1 to ELn is greater than a predetermined threshold value (step S1206).

If the number of correction histories is greater than the predetermined threshold value ("YES" in step S1206), the refresh control unit 1104 performs a refresh operation on the memory cell group from which the information has been read out, and erases the correction histories in the correction history storage units EL1 to ELn (step S1208).

If the number of correction histories is not greater than the predetermined threshold value ("NO" in step S1206), the correcting unit 103 registers the cell ID and the correction contents as a correction history in the correction history storage unit ELk (step S1207).

The information outputting procedures of step S1209 and step S1210 are the same as those of step S607 and step S608 to be carried out in the storage medium reproducing apparatus 100 of the first embodiment, and therefore, the explanation thereof is not repeated herein.

Although the number of correction histories is used as the error generation amount in FIG. 12, it is also possible to determine whether a refresh operation is necessary according to the error generation amount represented by the number of storage elements newly corrected using error correction codes, the number of storage elements exceeding a predetermined number of charge quantity threshold values, or the information storage capacity of the correction history storage units EL1 to ELn.

As described above, in the storage medium reproducing apparatus according to the fourth embodiment, a refresh operation is performed on storage elements, when the error generation amount exceeds a predetermined threshold value. Such a refresh operation can reduce error generation, and the amount of calculations required in correcting operations can be reduced accordingly.

The storage medium reproducing program to be executed in the storage medium reproducing apparatuses of the first to fourth embodiments is incorporated beforehand into a memory such as a ROM (Read Only Memory).

The storage medium reproducing program to be executed in the storage medium reproducing apparatuses of the first to fourth embodiments may be presented in an installable format or an executable file recorded on a computer-readable recording medium such as a CD-ROM (Compact Disk Read Only Memory), a flexible disk (FD), a CD-R (Compact Disk Recordable), or a DVD (Digital Versatile Disk).

The storage medium reproducing program to be executed in the storage medium reproducing apparatuses of the first to fourth embodiments may be stored in a computer connected to a network such as the Internet, and may be downloaded via the network. The storage medium reproducing program to be executed in the storage medium reproducing apparatuses of the first to fourth embodiments may also be presented or distributed via a network such as the Internet.

The storage medium reproducing program to be executed in the storage medium reproducing apparatuses of the first to fourth embodiments has a module structure including the above described components (a control unit, a correction history implementing unit, a correcting unit, and a refresh unit). In actual hardware, the CPU (Central Processing Unit) reads the storage medium reproducing program from the ROM, and executes the storage medium reproducing program. Accordingly, the above described components are loaded into and generated in the main storage.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A storage medium reproducing apparatus comprising:
   a storage unit that includes
      a plurality of information storage units storing information depending on whether a charge quantity is greater than a predetermined charge quantity threshold value, and
      a correction code storage unit storing error correction codes for the information stored in the plurality of information storage units;
   a correction history storage unit that stores a correction history containing identification information for identifying the information storage unit on which a correcting operation using an error correction code is performed among the information storage units, and a content of the correction;
   a correction history implementing unit that corrects information in compliance with the content of the correction stored in the correction history storage unit when the information is read from the information storage unit identified by the identification information; and
   a correcting unit that performs a correcting operation using an error correction code on the corrected information, and registers the correction history containing the identification information and the content of the correction of the information storage unit corrected using the error correction code, in the correction history storage unit.

2. The storage medium reproducing apparatus according to claim 1, wherein the correcting unit stores the identification information and the content of the correction of the corrected information storage unit in the correction history storage unit, when an information error generated due to release of charges accumulated in the information storage unit is corrected.

3. The storage medium reproducing apparatus according to claim 1, wherein the correction histories of all the information storage units contained in the storage units are stored in the correction history storage unit.

4. The storage medium reproducing apparatus according to claim 1, further comprising
   a refresh control unit that determines whether an error generation amount indicating the degree of error generation exceeds a predetermined first threshold value, and when the error generation amount exceeds the first threshold value, the refresh control unit performs a refresh operation so as to maintain a charge quantity in the information storage unit at a normal value.

5. The storage medium reproducing apparatus according to claim 4, wherein the refresh control unit determines whether a number of correction histories stored in the correction history storage unit exceeds a predetermined second threshold value, and when the number of correction histories exceeds the second threshold value, the refresh control unit performs a refresh operation.

6. The storage medium reproducing apparatus according to claim 4, wherein the refresh control unit determines whether a number of information storage units corrected by the correcting unit using error correction codes exceeds a predetermined second threshold value, and when the number of information storage units exceeds the second threshold value, the refresh control unit performs a refresh operation.

7. The storage medium reproducing apparatus according to claim 4, wherein the refresh control unit determines whether a number of information storage units having charge quantities exceeding a predetermined number of threshold values exceeds a predetermined second threshold value, and when the number of information storage units exceeds the second threshold value, the refresh control unit performs a refresh operation.

8. The storage medium reproducing apparatus according to claim 4, wherein the refresh control unit determines whether an information storage capacity of the correction history storage unit exceeds a predetermined second threshold value, and when the information storage capacity exceeds the second threshold value, the refresh control unit performs a refresh operation.

9. A storage medium reproducing method comprising:

correcting information that is read from an information storage unit identified by identification information in compliance with a correction content stored in a correction history storage unit that stores correction histories including the correction content and the identification information for identifying the information storage unit corrected using an error correction code among a plurality of information storage units each of which stores information depending on whether a charge quantity is greater than a predetermined charge quantity threshold value; and performing a correcting operation using an error correction code on the corrected information, and registering the correction history including the correction content and the identification information of the information storage unit corrected using an error correction code in the correction history storage unit.

10. A computer program product having a computer readable medium including programmed instructions for reproducing data on a storage medium, wherein the instructions, when executed by a computer, cause the computer to perform:

correcting information that is read from an information storage unit identified by identification information in compliance with a correction content stored in a correction history storage unit that stores correction histories including the correction content and the identification information for identifying the information storage unit corrected using an error correction code among a plurality of information storage units each of which stores information depending on whether a charge quantity is greater than a predetermined charge quantity threshold value; and performing a correcting operation using an error correction code on the corrected information, and registering the correction history including the correction content and the identification information of the information storage unit corrected using an error correction code in the correction history storage unit.

* * * * *